(No Model.)  2 Sheets—Sheet 1.

J. ROBERTS.
MILK COOLING APPARATUS.

No. 262,320.  Patented Aug. 8, 1882.

WITNESSES:
Louis Foerster
Wm. H. Carson.

INVENTOR
Joseph Roberts,
By his attorney in fact
Joshua Pusey.

N. PETERS, Photo-Lithographer, Washington, D. C.

(No Model.) 2 Sheets—Sheet 2.

J. ROBERTS.
MILK COOLING APPARATUS.

No. 262,320. Patented Aug. 8, 1882.

WITNESSES:
Louis Foerster
Wm. R. Carson.

INVENTOR
Joseph Roberts
by his attorney in fact
Joshua Pusey

UNITED STATES PATENT OFFICE.

JOSEPH ROBERTS, OF SOLEBURY, PENNSYLVANIA.

MILK-COOLING APPARATUS.

SPECIFICATION forming part of Letters Patent No. 262,320, dated August 8, 1882.

Application filed April 6, 1882. (No model.)

*To all whom it may concern:*

Be it known that I, JOSEPH ROBERTS, a citizen of the United States, residing in the township of Solebury, county of Bucks, and State of Pennsylvania, have invented a new and useful Improvement in Apparatus for Cooling Milk and other Liquids, of which the following is a specification.

The nature of my invention is an improved combination of devices for rapidly reducing the temperature of milk or other liquids by means of a current of water naturally cold in winter and artificially cooled in summer.

It consists in combining with the reservoir or vessel which receives the milk or other liquid to be cooled a detachable interior vessel, which is inserted within the former, and is divided into a connected series of closed channels or compartments, as hereinafter described, so that an extensive refrigerating-surface is presented to the liquid to be cooled by a continuous current of cold water flowing through such channels or conduits.

Figure 1:
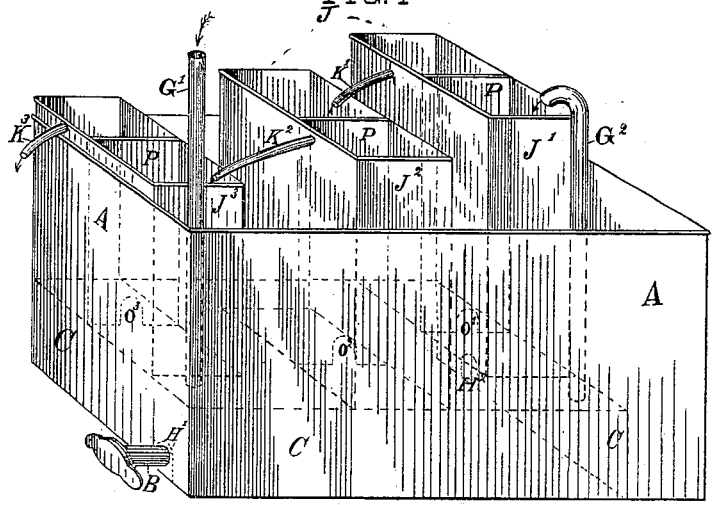
Figure 6:
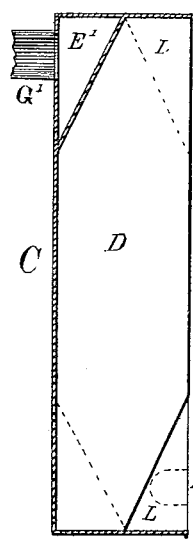
Figure 4:
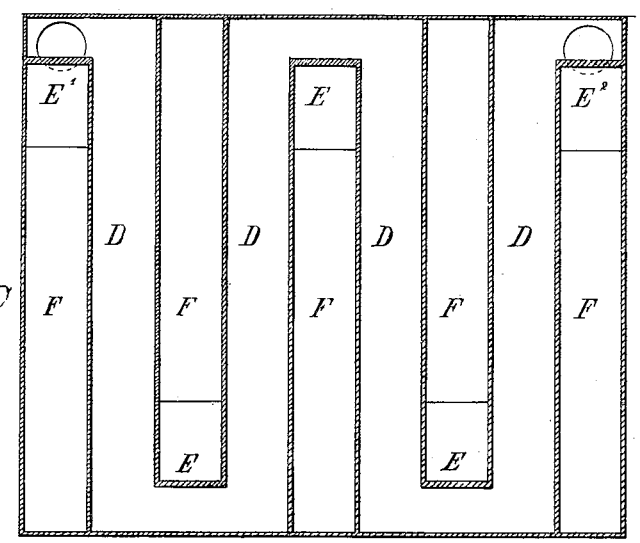
Figure 7:
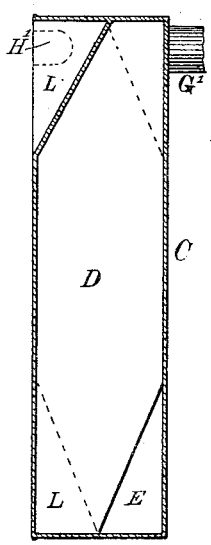
Figure 5:
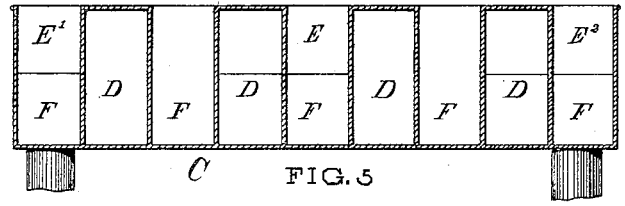
Figure 2:
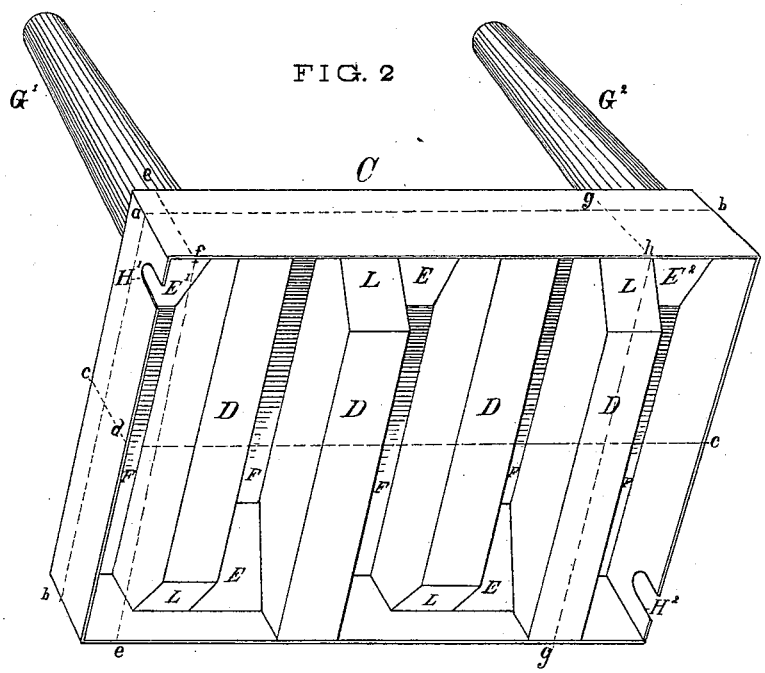
Figure 3:
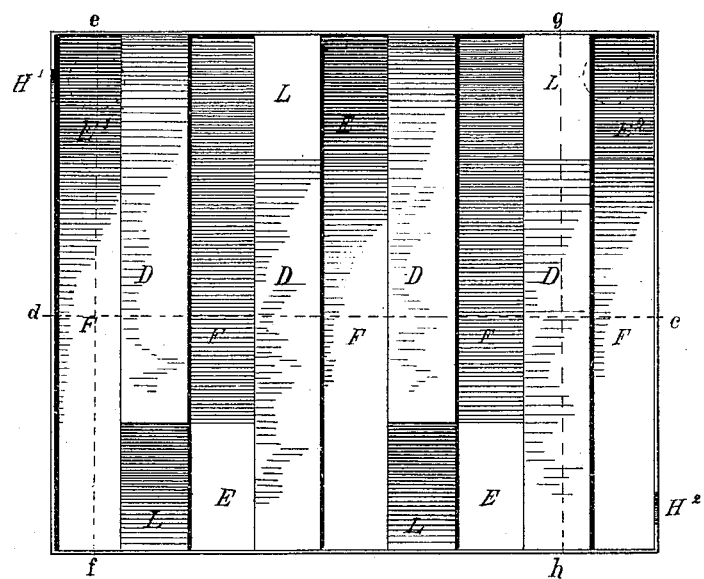

In the accompanying drawings, in which like letters of reference indicate corresponding parts, Figure 1 is a general perspective view of the invention, those parts which are obstructed from view being indicated by broken lines. Fig. 2 is an oblique perspective view, looking at the bottom, of the interior channeled vessel, and showing the particular construction thereof. Fig. 3 is a plan or view looking directly at the bottom, of said vessel. Fig. 4 is a section upon the line *a b*, Fig. 2. Fig. 5 is a section upon line *c d*, Fig. 6 a section upon line *e f*, and Fig. 7 a section upon line *g h*.

In Fig. 1, A is the receiver for the milk, &c., to be cooled. It may be of any suitable material and form, but preferably rectangular, as shown. It is provided with an exit or spigot, B, near the bottom, through which the milk escapes after it has been sufficiently cooled.

C, Figs. 2, 3, 4, 5, 6, and 7, is the interior vessel, made preferably of sheet-tin, and through which the current of cold water is caused to flow, and around the under side of which the milk circulates while being cooled, as will be hereinafter explained. It is constructed, as more clearly shown by Fig. 2, of a series of conduits, D, preferably of the general rectangular form shown, each of which communicates with its adjacent fellow at one end by way of passages E. Each of the spaces F between these conduits is substantially equal in dimensions and capacity to each one of the latter. It will be observed that the opposite alternate ends of conduits D are beveled or gradually contracted toward the bottom; also, that the communicating passages E are similarly beveled, so that as the vessel rests upon the bottom of the receiver A connected channels are formed by the latter and the spaces between conduits D, each communicating at alternate ends with the channel adjacent by way of the angular passages L, formed between the beveled ends of D and the bottom of the receiver. The object of this arrangement will be explained farther on. A pipe, G', enters the way E', which communicates with the first of said conduits, and a similar pipe, G², communicates with way E², which itself connects with the last of the series of conduits.

Having shown the construction of these vessels, I shall now proceed to describe their function and the *modus operandi* in cooling milk or other liquids.

Vessel C is placed within and upon the bottom of the receiver in the position indicated in Fig. 1. The milk is poured into or is allowed to enter the latter in a continuous stream, graded according to the cooling capacity of the water-current or the degree of refrigeration desired. A current of cold water is pumped into or permitted to flow into pipe G'. Its course is then down by way of E' into the first of the series of conduits D, thence to the other end of the latter by the passage E to the next conduit, and so on around until it finds an outlet by way of the pipe G². It is obvious that if a body or current of milk is brought into contact with the extensive surface presented by conduits D, through which the cold water is flowing, its temperature must be rapidly reduced. While the water is thus flowing in one direction, the milk-exit B being more or less open, a flow of milk within the receiver begins, the larger body thereof passing through the opening H² into the space F or channel formed by the bottom of A and the sides of C and the adjacent conduit, thence through the angular passage made by the inclined end of the conduit, and so on until it passes out by way of the opening H' to the exit or spigot B. About equal bodies of milk and water respectively are thus continuously presented to the surfaces of the conduits, the former on the exterior and the latter on the interior, and as the milk in its course becomes cooler its temperature approaches more nearly that of the water.

The foregoing-described devices and arrangement are alone sufficient when the temperature of the water is so low as not to require artificial aid. In the heat of summer, however, I combine with the foregoing a series of separate or detachable ice-boxes, J, Fig. 1, three in number in the present instance. These are preferably made of sheet-tin and divided each into two compartments communicating at the bottom through the partition P, as shown, by way of openings O. Each box is provided with an overflow-pipe, K, near the top, which empties into the opposite adjacent compartment of the next box in the manner shown. I place these boxes upon the top of vessel C, preferring to arrange them relatively, as shown in the figure—that is, at some distance apart—and one end of each alternately against opposite sides of the receiver A. The purpose of this will appear hereinafter.

The pipe G², instead of permitting the water which has passed through the vessel C to flow directly to the earth or elsewhere, as is done when the ice-receptacles are not in use, is bent over at its upper end, so as to empty into the ice-box adjacent to it. Now, the compartments of the several boxes J being filled with ice, the current of water is allowed to pass into pipe G', thence through the conduits of the vessel C, as described, to pipe G², whence it falls into the first compartment of the box J', thence by way of the opening O' into the other comparment, thence by pipe K' to the opposite compartment of the next icebox, and so on to the next until finally it flows out by way of pipe K³ to a reservoir, from which it may be pumped back again into pipe G', and thus continually as desired. The milk in addition to being cooled by the current of water as it flows on to the exit through the channels F between conduits D is also cooled by coming into contact with the ice-receptacles as it, or a portion thereof, flows around them in a devious course from one end to the other until it enters the passage H², which leads into the first of said channels.

Having described the construction and *modus operadi* of my invention, I shall briefly mention its advantages. These are economy of construction, the rapidity with which the temperature of the milk or other liquid may be reduced to the desired point, which is a specially-important matter in creameries, (for which the improvement is particularly adapted,) for the quicker the temperature of the milk is reduced to the required degree the better the cheese and butter made therefrom. Another advantage arising from the construction and arrangement of my apparatus, especially the vessel C, is the facility with which the same may be purified and kept sweet and pure by cleansing and exposure of the surfaces with which the milk has been in contact to the light of the sun. This dairymen especially will understand and appreciate. The readiness with which all the parts may be detached and rearranged for use is also a great advantage. Finally, the economy of ice in proportion to the result produced is an important feature when it may be necessary to use the same.

Having thus described my invention, I claim as new and wish to secure by Letters Patent—

1. The receiver A, having the outlet B, the detachable vessel C, provided with a series of closed conduits, D, communicating at alternate ends, and having the inlet-tube G' and the outlet-tube G², and a series of channels, F, between said conduits communicating at alternate ends and open at the bottom only, all constructed, combined, and operating substantially as and for the purpose described.

2. In an apparatus for cooling milk or other liquids by means of a current of cold water, the combination of the receiver A and the vessel C within the receiver, said vessel having the series of separated closed conduits D, communicating at alternate ends, the arrangement of said conduits with relation to each other and the top and sides of the vessel, and the bottom of the receiver being, as described and shown, so as to form a series of communicating channels, whereby the current of water may flow in one direction through the closed conduits while the liquid to be cooled flows in the opposite direction through said channels, substantially as and for the purpose set forth.

3. The vessel C, having a series of closed communicating conduits, and between the latter the communicating channels F, open at the bottom only, and having the inlet-tube G' and the outlet-tube G², said vessel being adapted to be inserted within and used in connection with a suitable receiver, substantially as and for the purpose described.

JOSEPH ROBERTS.

Witnesses:
ALFRED T. RICE,
WILLIAM BURNS.